(12) United States Patent
Maliczyszyn et al.

(10) Patent No.: US 6,413,372 B1
(45) Date of Patent: Jul. 2, 2002

(54) STARCH POLYMER COMBINATIONS USED IN PAPERMAKING

(75) Inventors: Walter Maliczyszyn, Somerville; Wolfgang Bindzus; Paul A. Altieri, both of Belle Mead, all of NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/633,674

(22) Filed: Aug. 7, 2000

Related U.S. Application Data

(63) Continuation-in-part of application No. 09/295,086, filed on Apr. 20, 1999, now abandoned.

(51) Int. Cl.$^7$ ........................ D21H 17/28; D21H 17/29
(52) U.S. Cl. ........................ 162/175; 162/135; 162/158; 162/164.6; 106/206.1; 106/210.1
(58) Field of Search ........................ 162/175, 135, 162/158, 167, 164.6, 179, 168.2, 168.1, 168.7; 106/206.1–207.3, 208.1, 208.3, 209.1, 210.1; 127/32, 65–71; 536/102, 109, 107, 117

(56) References Cited

U.S. PATENT DOCUMENTS

| | | | |
|---|---|---|---|
| 2,884,412 A | 4/1959 | Neukom | 260/233.5 |
| 2,884,413 A | 4/1959 | Kerr et al. | 260/233.5 |
| 2,961,440 A | 11/1960 | Kerr et al. | 260/233.5 |
| 3,284,443 A | 11/1966 | Hay et al. | 260/233.5 |
| 3,459,632 A | 8/1969 | Caldwell et al. | 162/175 |
| 3,467,647 A | 9/1969 | Benniga | 260/209 |
| 3,562,103 A | 2/1971 | Moser et al. | 162/175 |
| 3,843,377 A | 10/1974 | Alexander | 106/157 |
| 4,029,544 A | 6/1977 | Jarwenko et al. | 162/175 |
| 4,166,173 A | 8/1979 | Wurzburg et al. | 536/109 |
| 4,174,998 A * | 11/1979 | Shiel | 162/168.3 |
| 4,216,310 A | 8/1980 | Wurzburg et al. | 536/109 |
| 4,239,592 A * | 12/1980 | Gaspar et al. | 162/175 |
| 4,297,299 A * | 10/1981 | Tessler | 562/16 |
| 4,387,221 A | 6/1983 | Tessler et al. | 536/107 |
| 4,566,910 A * | 1/1986 | Hubbard et al. | 127/70 |
| 4,872,951 A | 10/1989 | Maliczyszyn et al. | 162/135 |
| 4,876,336 A | 10/1989 | Solarek et al. | 536/109 |
| 5,129,989 A | 7/1992 | Gosset et al. | 162/147 |
| 5,368,690 A * | 11/1994 | Solarek et al. | 162/175 |
| 5,378,830 A | 1/1995 | Yeh | 536/118 |
| 5,500,087 A * | 3/1996 | Bernard et al. | 162/164.6 |
| 5,723,023 A | 3/1998 | Tsi et al. | 162/175 |
| 5,817,180 A * | 10/1998 | Ferguson et al. | 127/32 |
| 5,827,372 A | 10/1998 | Bhirud et al. | 127/71 |

FOREIGN PATENT DOCUMENTS

| | | | | |
|---|---|---|---|---|
| GB | 218045 A | 7/1987 | | D21H/3/00 |
| JP | 6-173193 | 6/1994 | | D21H/17/67 |
| JP | 8-296193 | 11/1996 | | D21H/17/28 |
| WO | WO 85/02635 A1 | 6/1985 | | D21H/3/32 |

\* cited by examiner

*Primary Examiner*—José S. Fortuna
(74) *Attorney, Agent, or Firm*—Laurelee A. Duncan, Esq.; Eugene Zagarella, Esq.

(57) ABSTRACT

Paper having improved retention properties made by the addition to the papermaking system of a combination of cationic starch and starch phosphate, the starch combination having a select net zeta potential.

26 Claims, No Drawings

STARCH POLYMER COMBINATIONS USED IN PAPERMAKING

This application is a continuation-in-part of application Ser. No. 09/295,086 filed Apr. 20, 1999, now abandoned.

BACKGROUND OF THE INVENTION

This invention relates to an improved process of papermaking wherein polymer combinations of cationic and anionic starches having a select zeta potential are added to the stock or furnish in the wet end to provide improved retention as well as drainage and strength properties.

The term "paper" as used herein, includes sheet-like masses and molded products made from fibrous cellulosic material, which may be derived from natural sources, synthetics such as polyamides, polyesters, rayon and polyacrylic resins as well as from mineral fibers such as asbestos and glass. In addition, paper made from combinations of cellulosic and synthetic materials are applicable herein. Paperboard is also included within the broad term "paper".

Papermaking, as it is conventionally known, is a process of introducing an aqueous slurry of pulp or wood cellulosic fibers (which have been beaten or refined to achieve a level of fiber hydration and to which a variety of functional additives can be added) onto a screen or similar device in such a manner that the water is removed, thereby forming a sheet of the consolidated fibers, which upon pressing and drying can be processed into dry roll or sheet form. Two well known papermaking processes involve the Fourdrinier machine, the most common, and the cylinder machine. In the Fourdrinier and multicylinder operations, and in other machine operations, as typical in papermaking, the feed or inlet to the machine is an aqueous slurry or water suspension of pulp fibers which is provided from what is called the "wet end" system. In the wet end, the pulp along with other additives are mixed in an aqueous slurry and subjected to mechanical and other operations such as beating and refining to improve interfiber bonding and other physical properties of the finished sheet. Additives commonly introduced along with the pulp fibers are pigments such as titanium dioxide, mineral fillers such as clay and calcium carbonate and other materials introduced into paper to achieve such properties as improved brightness, opacity, smoothness, ink receptivity, fire retardance, water resistance, increased bulk, etc.

It has been known to add various materials, including starch, to the pulp, or stock in the papermaking process or prior to the formation of the sheet, to aid in retention, drainage and strength properties.

Starch has been used in the paper industry for many years and, in fact, is the second largest volume raw material component in paper. Starches perform a number of functions in papermaking including strength improvement, increased drainage and increased retention of fibers, fines and other components on the wire. Both unmodified and modified types have been used.

Anionic and cationic starches as well as amphoteric starches have long been used as additives in papermaking for their contributions to strength and pigment retention in the paper. See, for example, U.S. Pat. No. 3,459,632 issued to C. Caldwell et al. on Aug. 5, 1969 and U.S. Pat. No. 3,562,103 issued to K. Moser et al. on Feb. 9, 1971. More recent patents involving the use of starches in papermaking include U.S. Pat. No. 4,876,336 issued to D. Solarek et al. on Oct. 24, 1989 which discloses the use of amphoteric starch derivatives and U.S. Pat. No. 5,129,989 issued to S. Gosset et al. on Jul. 14, 1992 which discloses the use of cationic and anionic starches in separate additions.

Despite the various and well known use of different starches in papermaking, there is the continuing need and desire to provide improved papermaking properties and especially improved retention.

SUMMARY OF THE INVENTION

Now, it has been found that significantly improved retention properties can be obtained in the process of papermaking by the addition or combination of cationic starch and starch phosphate having a select zeta potential, to the stock or furnish in the wet end.

More particularly, this invention involves the process of making paper comprising adding to the paper stock or furnish prior to or during formation of the sheet, a combination of cationic starch and starch phosphate, the combination having a zeta potential of from about +20 to −18 mV (millivolts).

In another embodiment of this invention, paper is made using the combination of cationic starch and starch phosphate having a select zeta potential as described herein, and wherein the starch phosphate is made by impregnating the starch with a phosphate reagent and then drying to substantially anhydrous conditions, preferably while in a fluidized state, prior to heat treating to effect phosphorylation. Preferably both the drying and heat treatment take place while in the fluidized state.

DETAILED DESCRIPTION OF THE INVENTION

This invention involves a combination of modified cationic starches and starch phosphates in amounts to provide a selected zeta potential range for use in papermaking.

The modified starches which are used in this invention can be prepared by methods known and described in the art. Cationization of the starch can be produced by well known chemical reactions with reagents containing amino, imino, ammonium, sulfonium and phosphonium groups as disclosed, for example, in "Cationic Starches" by D. B. Solarek, *Modified Starches: Properties and Uses*, Chapter 8, pp. 113–129, 1986, and in U.S. Pat. No. 4,119,487 issued Oct. 10, 1978 to M. Tessler. Such cationic derivatives include those containing nitrogen groups comprising primary, secondary, tertiary and quaternary amines and sulfonium and phosphonium groups attached through either ether or ester linkages. The preferred derivatives are those containing the tertiary amino and quaternary ammonium ether groups.

The general method for preparing starches containing tertiary amine groups, which method involves reacting starch under alkaline conditions with a dialkylaminoalkyl halide is described in U.S. Pat. No. 2,813,093 issued on Nov. 12, 1957 to C. Caldwell, et al. Another method, therefore, is disclosed in U.S. Pat. No. 4,675,394 issued Jan. 23, 1987 to D. Solarek et al. The primary and secondary amine starches may be prepared by reacting the starch with aminoalkyl anhydrides, amino epoxides or halides, or the corresponding compounds containing aryl in addition to the alkyl groups.

Quaternary ammonium groups may be introduced into the starch by suitable treatment of the tertiary aminoalkyl ether or starch, as described in the previously noted U.S. Pat. No. 2,813,093. Alternatively, quaternary groups may be introduced directly into the starch by treatment with the reaction product of an epihalohydrin and a tertiary amine or tertiary amine salt, to provide, for example, (3-trimethylammonium chloride)-2-hydroxypropyl ether substituent groups as disclosed in the noted U.S. Pat. No. 4,119,487. The above noted patents, i.e., '487, '093 and '394 are incorporated herein by reference.

The preparation of cationic sulfonium derivatives is described in U.S. Pat. No. 2,989,520 issued June, 1961 to M. Rutenberg et al. and essentially involves the reaction of starch in an aqueous alkaline medium with a beta-halogenoalkylsulfonium salt, vinylsulfonium salt or epoxy-alkylsulfonium salt. The preparation of cationic phosphonium derivatives is disclosed in U.S. Pat. No. 3,077,469 issued Feb. 12, 1963 to A. Aszalos and involves reaction of starch in an aqueous alkaline medium with a beta-halogenoalkylphosphonium salt. The above noted patents, i.e. '520 and '469 are incorporated herein be reference.

Other suitable cationic starches may be provided using reagents and methods that are well known in the art as illustrated in the above references. Further description of useful cationic starches are disclosed in U.S. Pat. No. 2,876,217 issued Mar. 3, 1959 to E. Paschall, U.S. Pat. No. 2,970,140 issued Jan. 31, 1961 to C. Hullinger et al., U.S. Pat. No. 5,004,808 issued Apr. 2, 1991 to M. Yalpani et al., U.S. Pat. No. 5,093,159 issued Mar. 3, 1992 to J. Fernandez et al., and EP 406 837 published Jan. 1, 1991 (corresponding to U.S. application Ser. No. 516,024 filed Apr. 26, 1990), all of which are incorporated herein by reference. Particularly useful cationic derivatives are those containing amino or nitrogen groups having alkyl, aryl, aralkyl or cyclic substituents of up to 18 carbon atoms and especially alkyl of 1 to 6 carbon atoms.

The amount of cationic substituent on the starch can be varied and generally a degree of substitution (DS) of from about 0.003 to 0.2 and preferably from about 0.01 to 0.1 will be used. While larger amounts of cationic substituents or higher degrees of substitution (DS) could be used, they are more costly and difficult to make and therefore not economically attractive. The term "degree of substitution" (DS) as used herein means the average number of sites or substituent groups per anhydroglucose unit of the starch molecule.

The anionic starch used in this invention is a starch phosphate monoester. The starch phosphate can be prepared by phosphorylation using any known method including the reaction with various inorganic phosphate salts. The preparation of starch phosphate monoesters using such methods are described in "Phosphorylated Starches and Miscellaneous Inorganic Esters" by D. B. Solarek, *Modified Starches: Properties and Uses*, Chapter 7, pp. 97–112, 1986.

Phosphate groups are introduced into starch by thermal reaction with water-soluble ortho-, pyro-, meta-, or tripoly-phosphates. Illustrative phosphate reagents are the alkali metal phosphates such as sodium and potassium orthophosphate, phosphoric acid, phosphorus oxychloride, sodium and potassium tripolyphosphate and sodium and potassium trimetaphosphate. The reagent may be either a mono-, di- or trialkyl metal phosphate or combination thereof.

Techniques for phosphorylating a starch base are further described in U.S. Pat. Nos. 2,824,870 issued Feb. 25, 1959 to H. Neukom and 2,961,440 issued Nov. 22, 1960 to R. Kerr. These patents disclose techniques of heat reacting starch impregnated with a phosphate salt of an alkali metal, within a prescribed pH range. Previously noted U.S. Pat. No. 3,562,103 directed to starches containing anionic phosphate groups, discloses a method of phosphorylating starch which comprises forming an aqueous starch slurry at room temperature and adding a suitable concentration of phosphate reagent. Preferably, the pH is adjusted to between 4 and 6, although it is stated that a range of 4 to 11.5 may be used. The starch is filtered without washing and adjusted to a moisture level of about 20% or below, preferably from about 5 to 20% by weight at a temperature of less than about 70° C. The starch phosphate composition is then heated at a temperature of 100 to 160° C. until the product has the desired level of anionic phosphate groups. The above noted '870, '440 and '103 patents are all incorporated herein by reference.

In U.S. Pat. No. 4,166,173 issued Aug. 28, 1979 to O. B. Wurzburg et al., which disclosure is incorporated herein by reference, starch is phosphorylated by an improved pollution-free process which involves forming a concentrated reagent solution of alkali metal tripolyphosphate salt and impregnating therewith a starch cake containing no more than 45% by weight of moisture. Drying and thermally reacting the thus impregnated starch provides the phosphorylated starch. In preparing the concentrated reagent solution during addition of the tripolyphosphate salt to the water, one or more acids are added to control the pH at between 2.8 and 5.0.

For the purpose of this invention, any phosphate containing starch, native or modified may be used. For the modified product, the phosphorylation may be carried out by any of the known techniques with the thermal reaction of the phosphate impregnated starch being performed at a pH between 5.5 and 8.5, and preferably 6.0 to 8.5. The reaction of starch may be carried out, e.g., with sodium or potassium tripolyphosphate, sodium or potassium hexametaphosphate and sodium or potassium pyrophosphate salts yielding orthophosphate mono-ester groups, i.e., mono-starch phosphates. Other alkali metal salts may be used in place of sodium or potassium which are preferred as the phosphorylating reagent.

Thus, in carrying out phosphorylations employing an aqueous starch slurry, the pH of the starch slurry containing the phosphorylating reagent is adjusted to about 5.5 to 8.5. Use of pH levels below about 5.5 will result in a degraded starch while use of pH levels above about 8.5 may produce undesirable crosslinking. If phosphorylation is to be carried out by spraying the reagent, a starch slurry is ordinarily prepared and adjusted to be within the designated pH range and is then filtered. The reagent is sprayed onto the pH adjusted starch cake. The practitioner will recognize that it is also possible to prepare the filter cake at a slightly alkaline pH and impregnate it with an acidic solution of phosphate reagent such that the final pH of the starch-phosphate reagent mixture is within the defined pH range. The specific reagent used may require adjustments of pH levels. For example, sodium tripolyphosphate (STP) has limited solubility in water (0.2 g/cc at 25° C). In order to achieve higher solids solutions, the pH is maintained at 4.0 to 6.0 by addition of acid such as HCl or $H_3PO_4$ during dissolution of the salt. In contrast, sodium hexametaphosphate $(NaPO_3)_6$ shows very high solubility and concentrated solutions (20 to 36%, by weight) can be prepared with no pH adjustment. Suitable starch phosphate for this invention will include about 0.03 to 1.0% bound phosphorus, preferably about 0.1 to 0.5% by weight, based on the weight of dry starch. By the term "bound phosphorus" we mean phosphorus which is attached by an ester linkage to a hydroxyl group of the anhydroglucose backbone of the derivatized starch. Bound phosphorous may also be defined as the phosphorus that cannot be removed from the product by conventional washing or separation techniques.

Most commonly, the amount of phosphorylating reagent employed will range from about 0.5 to 12% by weight, based on weight of dry starch. For example, treatment of waxy maize with 3.5 to 4.0% of sodium tripolyphosphate will give a starch containing 0.14 to 0.22% of bound phosphorus. The starch cake containing the phosphorylating reagent is dried to a moisture less than about 9.0% and preferably from about 2.0 to 7.0% prior to the required thermal treatment at higher temperatures. Ordinarily, the dry mixture of starch and phosphorylating reagent is heated to temperatures of from about 110° to 140° C. and preferably will range from about 130° to 135° C. during the phosphorylation reaction. The heating period may range from 0.1 to 4 hours or more depending on the selected reagent, pH, temperature, etc. The phosphorylating operation is performed under conditions which avoid severe molecular degradation, as would be shown by a significant decrease in viscosity of the starch.

While, as described above, any phosphate containing starch may be used in this invention, a particularly useful starch phosphate is one that is made by impregnating the starch with phosphate and then dried to substantially anhydrous conditions before heat treating to effect phosphorylation. By anhydrous or substantially anhydrous conditions is meant less than about 1% by weight moisture content, based on the dry weight of starch. It is preferred that both the drying and phosphorylation steps take place in the fluidized state. While other drying and phosphorylating systems may be used which are not in the fluidized state, the fuidized state is preferred because it provides excellent heat and mass transfer which results in good and desired drying and reaction characteristics.

Impregnation by the phosphate reagent may be accomplished by adding the reagent, at a level of less than about 15% and preferably less than about 10% by weight, based on the dry weight of starch, either in the dry state or to the wet starch, or by dissolving the reagent in water to form an aqueous solution which is then mixed with the starch. These impregnation techniques are described in U.S. Pat. No. 4,166,173 noted above, and U.S. Pat. No. 4,216,310 issued on Aug. 5, 1980 to O. Wurzburg et al., both of which are incorporated herein by reference.

The impregnated starch is first subjected to the fluidized state and dried to anhydrous conditions of less than about 1% by weight moisture content based on the weight of starch, at less than about 140° C., more particularly between about 60 to 140° C., preferably between about 100 to 125° C. The dried product, while still in the fluidized state, is heated to between about 100 to 185° C., preferably between about 120 to 140° C. for about 30 to 300 minutes. At temperatures higher than about 150° C., the processing time is preferably less than about 45 minutes.

The method and conditions for impregnating and phosphorylating starch for the operation where the impregnated starch is dried to anhydrous conditions and then phosphorylated while in the fluidized state, can be the same as the known procedures desribed previously.

The fluidized state is achieved by vigorous mixing of the solid starch particles in vacuum or in a gas whereby a uniform distribution of starch throughout the vacuum or gas may be attained. Vigorous mixing may be accomplished by using air or gas, at or above atmospheric pressures in a fluidized bed reactor or by sufficient mechanical agitation. Where pressurized gas is used to effect the fluidized state, the velocity of the gas must achieve a minimum rate such that the particles are free to move and exhibit a "fluidized state". The fluidized state results in very efficient heat transfer and allows the starch to rapidly dry to a virtually anhydrous state at low temperature.

The phosphate esters prepared by predrying to anhydrous conditions while in the fluidized state, as described above, are characterized by improved purity as the high reaction efficiency provides a product with a high level of substitution while providing a low level of residual inorganic phosphate salts in the final starch phosphate monoester products. Further, the process minimizes undesirable side reactions such as starch hydrolysis and crosslinking. Such products are also characterized by improved viscosity, color and uniformity. The new process also preserves the granular integrity of the starch advantageously allowing the optional washing of the final product.

The starch phosphate prepared, as described above, using anhydrous conditions and the fluidized state involves a process having improved reaction efficiency. Reaction efficiency is defined to be the amount of bound phosphorous divided by the total amount of phosphorous used in the process, multiplied by 100. Phosphorus content can be measured by any suitable conventional analytical technique such as inductively couple plasma (ICP) or gravimeetric analysis. Reaction efficiencies of this process may be as high as about 70 to 85% or more, and are much improved over the reaction efficiency of traditional methods of phosphorylating starches.

The process of preparing starch phosphates by impregnating starch with a phosphate reagent and then drying to anhydrous conditions while in a fluidized state prior to heat treating is described in further detail in copending U.S. patent application #1878, entitled "Improved Starch Phosphates Ester Composition, Process and Method of Use in Food" with Wolfgang Bindzus et al. as inventors, filed on the same date as this application. The process and details of this process as described in this #1878 U.S. application are hereby incorporated herein by reference.

The starch which may be used as the base material in preparing the modified cationic starch and anionic starch materials of this invention may be derived from any plant source including corn, potato, wheat, rice, waxy rice, tapioca, waxy maize, sago, sorghum, high amylose starch such as amylose corn having 40% or more of amylose content, etc. Starch flours may also be used. Also included are the conversion products derived from any of the former bases including, for example, dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; derivatized or modified starches; and crosslinked starches. Preferred starches are waxy maize, corn, tapioca, potato starch and combinations thereof. The starch base may be a granular starch or a gelatinized starch, i.e., non-granular starch. It is further noted that the starch base material may be the same or different for each of the cationic starch or anionic starch components.

While the amount of modification, i.e., the cationic substitution and anionic substitution on the respective starch components can vary as noted above, the essential feature of this invention is that the respective combinations of the two components are provided in proportions such that the net zeta potential of the starch combination will be in the range of from about +20 to −18 mV and preferably from about +15 to −5 mV. Keeping the zeta potential within this range is important because when using the starch combination in a papermaking process, significant improvement is seen in filler retention as well as good drainage and strength properties.

When the papermaking process employing the cationic starch and anionic starch phosphate combination in accordance with this invention involves an alkaline papermaking system, i.e., where the pH of the system is typically greater than about 6.5, the starch combination will more particularly have a zeta potential of from about +18 to −18 mV and preferably from about +15 to −10 mV. When the papermaking process involves an acid papermaking system, i.e., pH of less than about 6.5, the cationic starch/anionic starch phosphate combination will have a zeta potential of from about +20 to +1 mV and preferably from about +17 to +5 mV.

The proportion or ratio of cationic starch and starch phosphate components in the starch combination of this invention can vary to a wide degree provided that the zeta potential range, as described herein, is satisfied. More particularly, the cationic starch and starch phosphate polymer components are generally provided in amounts of from about 4:1 to 1:4 parts by weight of cationic starch to starch phosphate. The term "zeta potential" as used herein refers to electrokinetic potential, the potential across the interface of solids and liquids and more particularly the potential across the diffuse layer of ions surrounding a charge colloidal particle. Zeta potential relates to surface charge and electrophoretic mobility and is a well known property measurement. A detailed discussion of zeta potential may be found in "Zeta Potential in Colloid Science, Principles and Applications" by Robert J. Hunter, Academic Press, 1988. Various methods are known for determining the zeta potential of different materials, with electrophoresis being the most common. Electrokinetic phenomena are observed when two phases move relative to each other under the influence of an electric field. Electrophoresis describes the motion of charged particles or droplets in an applied electric field. A thin layer of liquid adheres to the particle or droplet surface so that the shearing plane is located anywhere in the liquid. The potential at the shearing plane is called the electrokinetic or zeta potential. Zeta potential can readily be measured by the technique of microelectrophoresis. This involves measuring the velocity of individual particles in suspension, viewed in a microscope fitted with a reticule, the transit times across the reticule being recorded. Several microelectrophoresis instruments are available for measuring zeta potential. In this application, a Zetasizer 2000 instrument provided by Malvern Instruments Limited was used to measure zeta potential.

The combination of cationic starch and starch phosphate may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical, chemiground wood, ground wood or any combination of these fibers. Fibers of the viscose rayon or regenerated cellulose type may also be used if desired.

Any desired inert mineral fillers may be added to the pulp which is to be modified with the improved starch derivatives of this invention. Such materials include clay, titanium dioxide, talc, calcium carbonate, calcium sulfate and diatomaceous earths.

Other additives commonly introduced into paper may be added to the pulp or furnish, for example, dyes, pigments, sizing additives, alum, anionic retention aids, etc.

The amount of cationic starch and starch phosphate polymer combination (i.e. the total amount of both the cationic starch and starch phosphate components) that may be added to the wet end or paper pulp will be an effective additive amount, especially effective to improve filler retention. More particularly, from about 0.05 to 10% of the starch combination and preferably from about 0.1 to 2% by weight, based on the dry weight of the stock or furnish, may be used. The starch combinations are made as a component, i.e. the cationic starch and starch phosphate are combined together as one component to form the starch polymer combination. These starch materials or combination may be added to the papermaking system in the cooked or uncooked condition. If they are cooked, i.e. dispersed or solubilized, this may be accomplished by standard or known techniques such as batch cooking, jet cooking or steam injection cooking. The starch components can either be cooked together as a blend or cooked separately, then blended and combined together and added as one component to the papermaking system. When the starch materials are cooked, the desired paper characteristics may be achieved by using lesser amounts of starch.

In addition to the selected starch derivatives and other components that may be included in the alkaline papermaking system as described above, colloidal inorganic minerals may be added to the system to form an alkaline microparticle system. Such microparticle systems may include colloidal silica or bentonite, and alum and may be incorporated into the system in amounts of at least 0.001% and more particularly from about 0.01 to 1% by weight based on the weight of dry pulp. Further description of such microparticle inorganic materials may be found In U.S. Pat. No. 4,388,150 issued Jun. 14, 1983; U.S. Pat. No. 4,643,801 issued Feb. 17, 1987; U.S. Pat. No. 4,753,710 issued Jun. 28, 1988 and U.S. Pat. No. 4,913,775 issued Apr. 3, 1990; all of which are incorporated herein by reference.

The following examples will further illustrate the embodiments of this invention. In these examples all parts are given by weight and all temperatures in degrees Celsius unless otherwise noted.

EXAMPLE 1

A cationic starch was prepared in the following manner. Waxy maize (2500 g, about 10% moisture) and 3750 mL of water were charged into a reactor vessel fitted with means for heating and mechanical agitation. Under agitation, the slurry temperature was raised to 43° C. and the pH adjusted to 11.2 to 11.5 using an aqueous solution of sodium hydroxide (4% by weight). With agitation, 208 g of a 60% active, aqueous solution of 3-chloro-2-hydroxypropyltrimethyl ammonium chloride were added and the mixture allowed to react at 43° C. for 24 hours. The final pH of the system was 11.6. After the reaction was completed, the slurry was neutralized to pH of 7.0 with 10% hydrochloric acid and filtered with vacuum on a Buchner funnel. The cake was washed with water and air-dried at room temperature. It was found to have a nitrogen content of 0.32% by weight on a dry basis (db).

An anionic starch phosphate was prepared as follows. Waxy maize (400 g) with the pH adjusted to 8.5 was placed in a Hobart mixer and impregnated with an aqueous solution of sodium tripolyphosphate (STP) (9.5, g STP, 25.8 g $H_2O$) to provide a treatment level of 2.3%. The pH of the aqueous STP solution was adjusted to 5.3 with the slow addition of HCl to get complete dissolution before application to the starch. The STP solution was applied to the starch via a manual spray bottle over about 5 minutes. After STP addition was complete, mixing was continued for 10 minutes. The resulting impregnated starch was dried at 60° C. to 4% moisture in a forced air oven. The resulting material was ground to a fine powder, spread as a thin layer on a tray (3–20 mm), and heated to 155° C. for 30 minutes in a forced air oven. The amount of bound phosphorus in the product was determined by washing the sample with a 5% aqueous solution of ethylenediamine tetraacetic acid (EDTA) followed by rinsing with distilled water and measuring the phosphorus by inductively couple plasma (ICP) after acid dissolution of the starch. The sample produced was found to have a bound phosphorus content of 0.19%. Similar products were made using tapioca and corn starches.

Various combinations of the above prepared cationic starch and starch phosphate were made having different zeta potential charges (mV). The zeta potentials were determined using a Zetasizer 2000 instrument obtained from the Malvern Instruments Limited. Using this instrument, which involves a microelectrophoresis technique, and the procedure recommended by the manufacturer, zeta potential measurements were made for the various combinations. Sample combinations were prepared by dispersing 1 g of the selected starch combination in distilled water in a 150 mL Pyrex beaker. The dispersed combination was cooked in boiling water for 30 minutes, with stirring for the first 5 minutes. The combination was diluted to 0.1% with distilled water and cooled to room temperature. Samples of the starch combination solutions (20 mL) were injected into the instrument set at 25° C., and the average of three zeta potential readings recorded.

The various combinations were evaluated for filler retention in both alkaline and acid papermaking systems using standard Dynamic Alkaline Retention Evaluation, Tappi T 261 pm 90.

A standard papermaking furnish was prepared using a pulp stock which comprised an aqueous slurry of bleached hardwood kraft pulp (BHWK) and bleached softwood kraft pulp (BSWK). The pulp stock (80:20 BHWK:BSWK, parts by weight) was refined in a standard laboratory Valley beater to about 400 CSF (Canadian Standard Freeness) and a pH of 7.8 to 8.2 and contained precipitated calcium carbonate filler (30% db) with 8 to 10% fiber fines and total fines of 37 to 42%.

The test was run while mixing and agitating using a Britt jar with a screen having holes 76 microns in diameter. Sample combinations in various proportions with different zeta potentials were evaluated by adding selected amounts of the combinations to the pulp stock. The percent $CaCO_3$ retention was determined for each sample with the results given below in Table 1.

Similar results were obtained using an acid papermaking system with the filler clay retention results also given in Table 1.

A review of this table and the retention results will indicate that significant retention property improvements are obtained when using combinations of cationic starch and starch phosphate having zeta potential values within the selected range as described in this application.

TABLE I

| Cationic/Anionic Starch Combinations | Zeta | Amounts Applied (% on wt. of furnish) | | | |
|---|---|---|---|---|---|
| (w/w) | Potential (mV) | 0.5 | 1.0 | 1.5 | 2.0 |
| Acid papermaking (pH - 6.0) - Percent Clay Retention (%) | | | | | |
| 100/0 | +24.5 | 24.5 | 24.6 | 23.4 | 24.7 |
| 80/20 | +21.1 | 28.6 | 31.5 | 32.3 | 33.7 |
| 70/30 | +17.6 | 30.9 | 37.5 | 40.4 | 41.7 |

TABLE I-continued

| Cationic/Anionic Starch Combinations | Zeta | Amounts Applied (% on wt. of furnish) | | | |
|---|---|---|---|---|---|
| (w/w) | Potential (mV) | 0.5 | 1.0 | 1.5 | 2.0 |
| 60/40 | +15.8 | 30.2 | 38.1 | 45.6 | 49.7 |
| 50/50 | +13.3 | 27.1 | 38.2 | 44 | 52.9 |
| 40/60 | +1.1 | 19.4 | 22.8 | 27.9 | 34.6 |
| 30/70 | −7.8 | 19.4 | 24.4 | 27.9 | 36.8 |
| 20/80 | −16.4 | 18.9 | 20.9 | 25.3 | 28.8 |
| 0/100 | −19.7 | 17.2 | 16.8 | 16.9 | 17.0 |
| Alkaline Papermaking (pH - 7.8) - Percent $Ca\ CO_3$ Retention | | | | | |
| 100/0 | +24.5 | 11.3 | 8.2 | 8.4 | 8.5 |
| 80/20 | +21.1 | 17.2 | 17.1 | 16.1 | 15.9 |
| 70/30 | +17.6 | 19.4 | 19.7 | 19.4 | 18.7 |
| 60/40 | +15.8 | 20.2 | 21.6 | 20.9 | 20 |
| 50/50 | +13.3 | 23.2 | 25.2 | 26.3 | 26.5 |
| 40/60 | +1.1 | 27.2 | 32.1 | 32.2 | 33 |
| 30/70 | −7.8 | 23.7 | 26.6 | 27.5 | 29.4 |
| 20/80 | −16.4 | 20.9 | 22.9 | 24.1 | 26.2 |
| 0/100 | −19.7 | 18.4 | 18.4 | 18.8 | 17.2 |

EXAMPLE 2

For comparative purposes, sample combinations of cationic starch and starch phosphates as prepared in Example 1 and having zeta potential within the preferred ranges were evaluated for calcium carbonate retention and compared with an amphoteric waxy starch material (0.25% cationic N content, 0.12% bound P content) and a cationic waxy starch (0.33% N quat). Results are reported in Table 2 below.

Similar results are given for the same starch combinations in an acid system to determine percent filler clay retention. Results are also found in Table 2.

The results show significantly improved retention properties in both alkaline and acid papermaking systems when using the starch combinations of this invention when compared to an amphoteric starch (having both cationic and anionic groups on the same starch molecule) or a cationic starch.

TABLE 2

| Samples | Zeta Potental (mV) | Amount Applied (% on wt. Of furnish) | | | |
|---|---|---|---|---|---|
| | | 0.5 | 1.0 | 1.5 | 2.0 |
| Alkaline Papermaking System | | | | | |
| Cationic/Anionic Starch 50/50 Combination | +13.3 | 17.1 | 18.8 | 19.6 | 18.3 |
| Cationic/Anionic Starch 40/60 Combination | +1.1 | 20.6 | 20.8 | 21.5 | 22.5 |
| Control (Amphoteric Starch) | +14.8 | 12.6 | 11.1 | 10.4 | 9.2 |
| Control (Cationic Starch) | +24.5 | 9.2 | 6.3 | 5 | 5.6 |
| Acid Papermaking System | | | | | |
| Cationic/Anionic Starch 50/50 Combination | +13.3 | 44.1 | 49.3 | 50.1 | 47.6 |
| Cationic/Anionic Starch 40/60 Combination | +1.1 | 44.6 | 49.5 | 48.8 | 47.6 |
| Control (Amphoteric Starch) | +14.8 | 35.6 | 36.7 | 35 | 33.3 |
| Control (Cationic Starch) | +24.5 | 27.4 | 25.6 | 24.7 | 26.5 |

EXAMPLE 3

Additional combinations of cationic starch and starch phosphates were prepared as in Example 1 using tapioca starch as the base material. The cationic tapioca had a nitrogen content of 0.24% (db) and the tapioca phosphate had a bound phosphorus of 0.18%. Combinations of the tapioca starches were made having zeta potentials within the desired range and evaluated for calcium carbonate retention in an alkaline papermaking system and for clay retention in an acid papermaking system. The results are shown in Table 3 below and are compared with an amphoteric tapioca starch (0.28% cationic N; 0.1% bound P) and a cationic tapioca starch (0.24% cationic N).

The results in Table 3 show significant improvement in retention in both alkaline and acid papermaking systems when using the starch combinations of this invention when compared to the amphoteric tapioca (having both cationic and phosphate groups on the same starch molecule) or a cationic tapioca starch.

TABLE 3

| Samples | Zeta Potential (mV) | Amount Applied (% on wt. of furnish) | | | |
|---|---|---|---|---|---|
| | | 0.5 | 1.0 | 1.5 | 2.0 |
| Acid Papermaking (pH 6.0) - Clay Retention (%) | | | | | |
| Cationic/Anionic Tapioca (50/50 - w/w Combination) | +13.8 | 48.5 | 54.7 | 56.9 | 56.6 |
| Cationic/Anionic Tapioca (40/60 - w/w Combination) | −4.9 | 46.4 | 56.5 | 61.3 | 63.9 |
| Amphoteric Tapioca (Control) | +22.5 | 34.2 | 33.7 | 32.3 | 32.2 |
| Cationic Tapioca (Control) | +28.7 | 28.6 | 28.6 | 30.4 | 29.6 |
| Alkaline Papermaking (pH 7.8) - CaCO$_3$ Retention (%) | | | | | |
| Cationic/Anionic Tapioca (50/50 - w/w Combination) | +13.8 | 21.1 | 21.5 | 21.4 | 20.8 |
| Cationic/Anionic Tapioca (40/60 - w/w Combination) | −4.9 | 22 | 22.2 | 24.3 | 23.8 |
| Amphoteric Tapioca (Control) | +22.5 | 14.7 | 13.3 | 11.6 | 11.6 |
| Cationic Tapioca (Control) | +28.7 | 10.4 | 8.3 | 8.4 | 9.6 |

EXAMPLE 4

Samples of cationic starch and starch phosphate were prepared as in Example 1 with the individual starches cooked separately and then combined together before adding to the papermaking system. Starch combinations were evaluated as a 50/50, weight/weight (w/w) sample for CaCO$_3$ retention in an alkaline papermaking system. Results are compared with an amphoteric starch and a cationic starch (all starches are the same as in Example 1) and given below in Table 4. These results show the improved retention properties for the starch combinations of this invention when compared to either the amphoteric or cationic starches.

TABLE 4

| Alkaline Papermaking (pH 7.8) - CaCO$_3$ Retention (%) | | | | | |
|---|---|---|---|---|---|
| Samples | Zeta Potential (mV) | Amount Applied (% on wt. of furnish) | | | |
| | | 0.5 | 1.0 | 1.5 | 2.0 |
| Cationic/Starch Phosphate (50/50 - w/w Combination) | 15.3 | 23.4 | 26.9 | 28.1 | 32.4 |
| Amphoteric Starch (Control)) | 13.7 | 23.5 | 22.8 | 20.3 | 20.3 |
| Cationic Starch (Control) | 25.3 | 17.5 | 14.8 | 10.8 | 12.8 |

EXAMPLE 5

Waxy corn starch was impregnated with an aqueous sodium tripolyphosphate solution according to a method described in U.S. Pat. No. 4,166,173. After impregnation, the total amount of phosphorous on starch was 1.05% by weight. Four (4) kg of the impregnated starch was then dried in a fluid bed reactor by heating up to about 113° C. (235° F.) until the moisture content was less than about 1% by weight. In order to effect phosphorylation, the dried impregnated starch in the reactor was heated and reacted at a temperature of about 116° C. (240° F.) for 45 minutes. The heat treatment in the fluid bed reactor resulted in a level of bound phosphorus of 0.17%.

The waxy corn starch phosphate ester, prepared as described above, was blended with a cationic waxy corn starch, prepared as in Example 1, at a ratio that resulted in a zeta potential of +14.5 mV, (Sample A). This Sample A together with a reference sample (Sample B) which is a blend of cationic starch and anionic starch at a weight ratio of 50:50 and made as described in Example 1, were evaluated for drainage performance in paper pulp under acidic conditions. The results are shown below in Table 5.

TABLE 5

| Drainage Performance Acid Papermaking (pH - 6.0) | | |
|---|---|---|
| Starch Addition Lbs/T | Sample A Drainage (cc/sec) | Sample B Drainage (cc/sec) |
| 10 | 128 | 124 |
| 20 | 165 | 158 |
| 30 | 187 | 176 |
| 40 | 200 | 186 |

The results in Table 5 show that the drainage performance of the blend containing the fluid bed made starch phosphate dried to anhydrous conditions (Sample A) was better than the reference blend (Sample B) which contained starch phosphate prepared in the conventional manner.

The blend of cationic waxy corn starch and waxy corn starch phosphate prepared using anhydrous conditions and a fluidized bed reactor, as described above (Sample A) was evaluated for filler retention. This was accomplished in an alkaline papermaking system as described in Example 1. Results were compared with a reference sample made up of a blend of cationic starch and anionic starch (made in conventional manner) (Sample B) and made in accordance with Example 1. The results shown below in Table 6 indicate that retention performance of Sample A (fluid bed/anhydrous starch phosphate) was significantly increased when the starch addition level was increased to 40 lbs/ton of paper and was similar to that of the reference sample.

TABLE 6

| Retention Performance Alkaline Papermaking (pH - 7.8) | | |
|---|---|---|
| Starch Addition Lbs/T | Sample A Retention (% CaCO) | Sample B (Retention (%CaCO) |
| 10 | 16.5 | 20.3 |
| 20 | 30.5 | 36.5 |
| 30 | 42.3 | 45.1 |
| 40 | 49.2 | 49.6 |

EXAMPLE 6

A potato starch phosphate ester was prepared in a fluid bed reactor as follows. Sodium tripolyphosphate (188 g) was dissolved in 6000 g of water. Then 4000 g, dry weight, of potato starch was slurried into the aqueous sodium tripolyphosphate solution. The slurry was stirred for 30 minutes and filtered on a Buchner funnel. The resulting starch cake was air dried to a moisture content of about 12% by weight and ground using a Prater mill. The phosphorylation reaction in a fluid bed reactor was carried out as follows. The starch was dried in the fluid bed reactor at a temperature of about 110° C. (230° F.) until the moisture content of the starch was less than 1%. Then, the temperature was increased to the reaction temperature of 149° C. (300° F.) and maintained for 30 minutes. The reaction resulted in a potato starch phosphate ester having 0.24% bound phosphorus. The potato starch phosphate ester was blended with a cationic waxy corn starch (prepared as described in Example 1) at a ratio which resulted in a zeta potential of +14.0 mV (Sample D). Sample D and reference Sample B (prepared as described in Example 5) were evaluated for drainage performance in paper pulp under acidic conditions. The results shown below in Table 7 indicate that the blend containing the fluid bed/anhydrous prepared potato starch phosphate (Sample D) showed an increased drainage rate as the starch addition level was increased to 40 lbs/ton of paper. Also Sample D showed significantly faster drainage than the reference Sample B.

TABLE 7

Drainage Performance
Acid Papermaking (pH - 6.0)

| Starch Addition lbs/T | Sample D Drainage (cc/sec) | Sample B Drainage (cc/sec) |
|---|---|---|
| 10 | 147 | 143 |
| 20 | 195 | 167 |
| 30 | 234 | 181 |
| 40 | 250 | 192 |

The blend of potato starch phosphate ester and cationic waxy corn starch (Sample D) which is described above, was evaluated along with reference Sample B for filler retention in an alkaline papermaking system (as described in Example 1). The results given in Table 8 show an increased level of filler retention for the sample blend containing the potato starch phosphate ester (Sample D) as the level of starch addition was increased to 40 lbs/ton of paper. The filler retention of Sample D also was significantly better than that of reference Sample B.

TABLE 8

Retention Performance
Alkaline Papermaking (pH - 7.8)

| Starch Addition Lbs/T | Sample D Retention (% CaCO$_3$) | Sample B Retention (% CaCO$_3$) |
|---|---|---|
| 10 | 44.9 | 15.9 |
| 20 | 69.1 | 28.9 |
| 30 | 68.7 | 40 |
| 40 | 62.2 | 47.6 |

EXAMPLE 7

A waxy corn starch phosphate ester was prepared as follows. Sodium tripolyphosphate (88 g) was dissolved in 4500 g of water, then waxy corn starch (3000 g, dry weight) was slurried into the aqueous sodium tripolyphosphate solution and stirred for about 10 minutes. The starch slurry was filtered on a Buchner funnel then air dried and ground using a Prater mill. The starch was then dried in a fluid bed reactor by heating to 116° C. (240° F.) until the moisture content was less than 1%. The temperature of the fluid bed reactor was then increased to 149° C. (300° F.) and held there for sixty minutes to phosphorylate the starch. This reaction resulted in a bound phosphorous of 0.19%. The waxy corn starch phosphate was blended with cationic corn starch (described in Example 1) at a ratio which resulted in a zeta potential of +12.5 mV (Sample E). Sample E was evaluated for drainage performance in paper pulp under acidic conditions. The results were compared to the drainage performance of Sample A (Example 5). Sample A contains a waxy corn starch phosphate ester which was made in a fluid bed reactor at a significantly lower reaction temperature (116° C./240° F.). Results shown below in Table 9 indicate that Sample A has better drainage performance than Sample E. This is an indication that use of phosphorylated starch prepared in a fluid bed reactor under high temperature and time conditions (Sample E) has a negative effect on the performance of starch phosphates as a drainage aid in papermaking (compare with Sample A).

TABLE 9

Drainage Performance
Acid Papermaking (pH 6.0)

| Starch Addition lbs/t | Sample E Drainage (cc/sec) | Sample A Drainage (cc/sec) |
|---|---|---|
| 10 | 76 | 128 |
| 20 | 96 | 165 |
| 30 | 113 | 187 |
| 40 | 135 | 200 |

What is claimed is:

1. A method of making paper having improved retention properties comprising adding to the paper stock prior to or during formation of the sheet, an effective amount of a combination of more than one starch polymer comprised of a cationic starch and a starch phosphate, the starch polymer combination being proportioned to have a zeta potential of from about +20 to −18 mV.

2. The method of claim 1 wherein the starch in the cationic starch and starch phosphate components is waxy maize, corn, tapioca, potato starch or a combination thereof.

3. The method of claim 2 wherein the cationic starch is cationized with a tertiary amino or quaternary ammonium ether group.

4. The method of claim 3 wherein the starch phosphate is prepared by reaction with an alkali metal ortho-, pyro-, meta- or tripolyphosphate.

5. The method of claim 4 wherein the zeta potential of the starch combination is from about +15 to −5 mV.

6. The method of claim 5 wherein the cationic starch has a 2-diethylaminoethylchloride or a 3-chloro-2-hydroxypropyltrimethyl ammonium ether cationic group.

7. The method of claim 6 wherein the starch phosphate is prepared by reaction with alkali metal tripolyphosphate.

8. The method of claim 1 wherein the paper is made in an alkaline papermaking system and the zeta potential of the starch combination is from about +18 to −18 mV.

9. The method of claim 8 wherein the starch in the cationic starch and starch phosphate components is waxy maize, corn, tapioca, potato starch or a combination thereof.

10. The method of claim 9 wherein the cationic starch is cationized with a tertiary amino or quaternary ammonium ether group.

11. The method of claim 10 wherein the starch phosphate is prepared by reaction with an alkali metal ortho-, pyro-, meta or tripolyphosphate.

12. The method of claim 11 wherein the zeta potential of the starch combination is from about +15 to −10 mV.

13. The method of claim 12 wherein the cationic starch has a 2-diethylaminoethyl chloride or a 3-chloro-2-hydroxypropyltrimethyl ammonium ether cationic group and the phosphate used in preparing the starch phosphate is alkali metal tripolyphosphate.

14. The method of claim 1 wherein the paper is made in an acid papermaking system and the zeta potential of the starch combination is from about +20 to +1 mV.

15. The method of claim 14 wherein the starch in the cationic starch and starch phosphate components is waxy maize, corn, tapioca, potato starch or a combination thereof.

16. The method of claim 15 the cationic starch is cationized with a tertiary amino or quaternary ammonium ether group.

17. The method of claim 16 wherein the phosphate used in preparing the starch phosphate is an alkali metal ortho-, pyro-, meta-, or tripolyphosphate.

18. The method of claim 17 wherein the zeta potential of the starch combination is from +17 to +5 mV.

19. The method of claim 18 wherein the cationic starch has a 2-diethylaminoethyl chloride or a 3-chloro-2-hydroxypropyltrimethyl ammonium ether cationic group.

20. The method of claim 19 wherein the phosphate used in preparing the starch phosphate is an alkali metal tripolyphosphate.

21. The method of claim 1 wherein the starch phosphate is made by:

a.) impregnating the starch with a phosphate reagent to form an impregnated starch:

b.) drying the impregnated starch to substanially anhydrous conditions; and c.) heating to phosphorylate the starch.

22. The method of claim 21 wherein the impregnated starch is dried to a moisture content of less than 1% by weight of starch.

23. The method of claim 22 wherein the impregnated starch is dried and phosphorylated while in a fluidized state.

24. The method of claim 23 wherein the starch in the cationic starch and starch phosphate components Is waxy maize, corn, tapioca, potato starch or a combination thereof.

25. The method of claim 24 wherein the cationic starch is canonized with a tertiary amine or quaternary ammonium ether group and the starch phosphate is prepared by reaction with an alkali metal ortho-, pyro-, meta-, or tripolyphosphate.

26. The method of claim 25 wherein the zeta potential of the starch combination is from about +15 to −5 mV.

* * * * *